United States Patent [19]
Thompson

[11] Patent Number: 6,008,724
[45] Date of Patent: Dec. 28, 1999

[54] METHOD AND APPARATUS FOR CHECKING THE INTEGRITY OF AN AUTOLUBRICATION SYSTEM

[75] Inventor: Ken Thompson, Dorset, United Kingdom

[73] Assignee: Filtakleen (Manufacturing) Limited, Dorset, United Kingdom

[21] Appl. No.: 08/762,215

[22] Filed: Dec. 6, 1996

[51] Int. Cl.[6] ...................................................... B60Q 1/00
[52] U.S. Cl. .......................... 340/438; 340/626; 340/679; 364/505; 364/184; 184/6.4
[58] Field of Search ...................................... 340/438, 439, 340/626, 679; 364/140, 505, 184, 558; 184/6.4, 39.1, 108, 55.1, 6.1, 6.14, 6, 7.2, 7.3

[56] References Cited

U.S. PATENT DOCUMENTS 5,417,308   5/1995   Hartl ......................................... 184/6.4

Primary Examiner—Nina Tong
Attorney, Agent, or Firm—Thorpe, North & Western, L.L.P.

[57] ABSTRACT

A method and apparatus for checking the integrity of an autolubrication system for large trucks, busses and the like includes an autolubrication system which includes a pump in communication with a plurality of conduits for forcing lubricants through the conduits under pressure. Preferably the conduits are subdivided into main conduits which are formed of steel, manifolds which receive the lubricants from the main conduits, and a plurality of at least partially flexible runner lines extending from the manifolds to lubrication receiving points. In accordance with one aspect of the method and apparatus, the pump can be activated from a remote location so as to enable the user to feel the runner lines with his or her hands immediately following actuation of the pump to ensure that a discharge pulse can be felt, thereby indicating that lubricant is properly passing through the other line. In accordance with another aspect of the method and apparatus, sensors may be placed along the conduits to monitor pressure changes and thereby ensure that the conduits are properly carrying lubricant to the lubrication-receiving points.

24 Claims, 4 Drawing Sheets

METHOD AND APPARATUS FOR CHECKING THE INTEGRITY OF AN AUTOLUBRICATION SYSTEM

BACKGROUND OF THE INVENTION

1. Field of the Invention

The present invention relates to a method and apparatus for delivering grease or some other lubricant to various locations on a vehicle. More particularly, the present invention relates to a method and apparatus used to conveniently ensure than an automatic lubrication system is functioning properly.

2. State of the Art

In order to function properly and to reduce premature wear, most motor vehicles require that joints in the chassis, steering mechanisms and other structures be lubricated periodically. On an truck, such lubrication is typically done every 8,000 to 10,000 miles when the oil is changed to ensure that premature wear does not develop.

With most large trucks, however, simply applying lubrication with every oil change is not sufficient. A large tractor-trailer truck or a bus may cover the 3–5,000 mile range in a matter of a week, and such vehicles are typically configured so that a much greater distance can be traveled between regular oil changes. Additionally, the significant weight of the truck or bus leads quickly to premature wear if the components are not frequently lubricated, and the significant cost of such vehicles necessitates that they be properly maintained.

To further complicate the lubrication process, a truck may have dozens or even a hundred different lubrication-receiving points which need periodic applications of grease, etc. A common number of lubrication-receiving points for many trucks is approximately thirty two, and the lubrication-receiving points are disposed at various locations around the truck. If each of these points were to be hand lubricated as is commonly done with automobiles, considerable time would be lost.

To overcome these concerns, automatic lubrication systems were developed. One common system utilizes a grease pump which is connected by a plurality of main conduits to a plurality of manifolds. Once in the manifolds, the grease is channeled down one of several secondary conduits in the form of runner lines, and is ultimately ejected from a lubrication fitting onto the surface which needs lubrication. FIG. 1 shows a plan view of the tractor of a tractor-trailer truck and the various points which may be lubricated by such an automatic lubrication system, generally indicated at 10.

When the user desires to lubricate the various lubrication points 14, the user activates a pump 18. The pump moves grease or some other lubricant through one or more conduits 22, which feed one or more manifolds 26. The runner lines 30 extend from each manifold 26 and each terminates at a lubrication point 14. Thus, the user is able to apply lubricant to each lubrication point from a single location.

One problem with such a system is that it is difficult for the user to tell if the system is working properly. If the conduit 22 has broken, the grease will flow out of the conduit and will not be applied to the various lubrication-receiving points 14. If such a situation is not caught quickly, considerable damage can be done to the vehicle.

More likely than not, however, a failure is in one of the runner lines 30 which extend from the manifold to a lubrication-receiving point 14. While the overall damage caused by such a failure is not as great as a failure of a main conduit 22, a failure in a runner line 30 is more likely to go for an extended period of time without being noticed. During this time, considerable damage can be done to the surface which should have been lubricated.

To prevent such an occurrence from happening, the driver of the truck or bus would occasionally have to crawl under the truck or bus and examine the autolubrication system to make such each part was working properly. Such an inspection, however, can take a considerable amount of time and is often inconvenient—especially in foul weather.

Thus, there is a need for a method and an apparatus which can be used to check such an autolubrication system to ensure that it is working properly and that each lubrication point is receiving the lubricant. Such a method and apparatus should enable the user to check each main conduit and each runner line to ensure that lubrication is being dispensed as desired. Such a method and apparatus should also enable the activation of the autolubrication system from a substantially remote location, i.e. when the user is adjacent any one of the lubrication points.

SUMMARY OF THE INVENTION

Thus, it is an object of the present invention to provide a method and apparatus for checking the integrity of an automatic lubrication system.

It is another object of the present invention to provide such a method and apparatus which enables the user to determine if any of the main conduits of the autolubrication system have failed.

It is yet another object of the present invention to provide such a method and apparatus which enables the user to determine if any of the runner lines have failed.

It is still another object of the present invention to provide such a method and apparatus which enables testing of the system while the user is substantially remote from the pump, i.e. when the user is adjacent one or more of the lubrication points, thereby enabling the user to inspect any potentially defective line or conduit while the automatic lubrication system is being engaged.

It is still yet another object of the present invention to provide such a system which enables testing of at least part of the system while the vehicle in which the system is disposed is moving.

The above and other objects of the invention are realized in specific illustrated embodiments of a method and apparatus for checking the integrity of an autolubrication system which includes a pump, and a plurality of conduits and/or runner lines for conveying grease or some other lubricant to the lubrication-receiving points. The apparatus and method includes a manually-operable switch which can activate the pump from a substantially remote location. By touching the runner lines for a few seconds after the switch has been actuated, the user may tell if any of the runner lines have failed. Specifically, when a runner line is properly connected to a fitting adjacent the lubrication receiving point, the considerable pressure generated by the pump creates a discharge pulse generated by back pressure within the runner line. This discharge pulse may be felt by simply placing one's finger on the line as the lubrication is dispensed. If a discharge pulse is not felt in the runner line, the user may then observe the line more closely to determine the cause of the failure.

In accordance with one aspect of the invention, pressure sensing mechanisms, such as a pressure transducer can be placed adjacent a plurality of the runner lines to enable detection of the discharge pulse without the need for the user to leave the vehicle. If a discharge pulse of sufficient magnitude is not felt, an alarm mechanism is activated to indicate to the user that there is a failure of the system.

In accordance with another aspect of the invention, the user may sense a plurality of runner lines immediately after the remote switch has been actuated to determine the integrity of the main conduits upstream. A failure of all of the runner lines monitored to develop a discharge pulse indicates that there has been a failure upstream from the point at which the user is touching the runner lines and can be more fully investigated.

In most such systems, the pump feeds one or more main conduits which feed a plurality of manifolds, each of which, in turn, feeds a plurality of runner lines. In accordance with another aspect of the present invention, a pressure sensor is disposed in communication with the manifold to determine the pressure received by the manifold. If the pressure detected by the pressure sensor following actuation of the pump is significantly below the pressure typically produced by the pump, the sensors send a signal which indicates that there has been a failure of one of the conduits or of the pump. The user is thus notified that the system has a failure. The user may then investigate and resolve the problem before the lack of lubrication causes unnecessary wear.

In accordance with yet another aspect of the present invention, the method and apparatus for checking the integrity of the autolubrication system can be utilized while the truck or bus is stationary, or while it is in transit. Additionally, timers may be included to automatically actuate the autolubrication system and perform the tests made available by the method and apparatus of the present invention.

To further determine the integrity of the system, numerous sensors could be used to assist the user in isolating exactly where the failure has occurred prior to exit from the vehicle.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
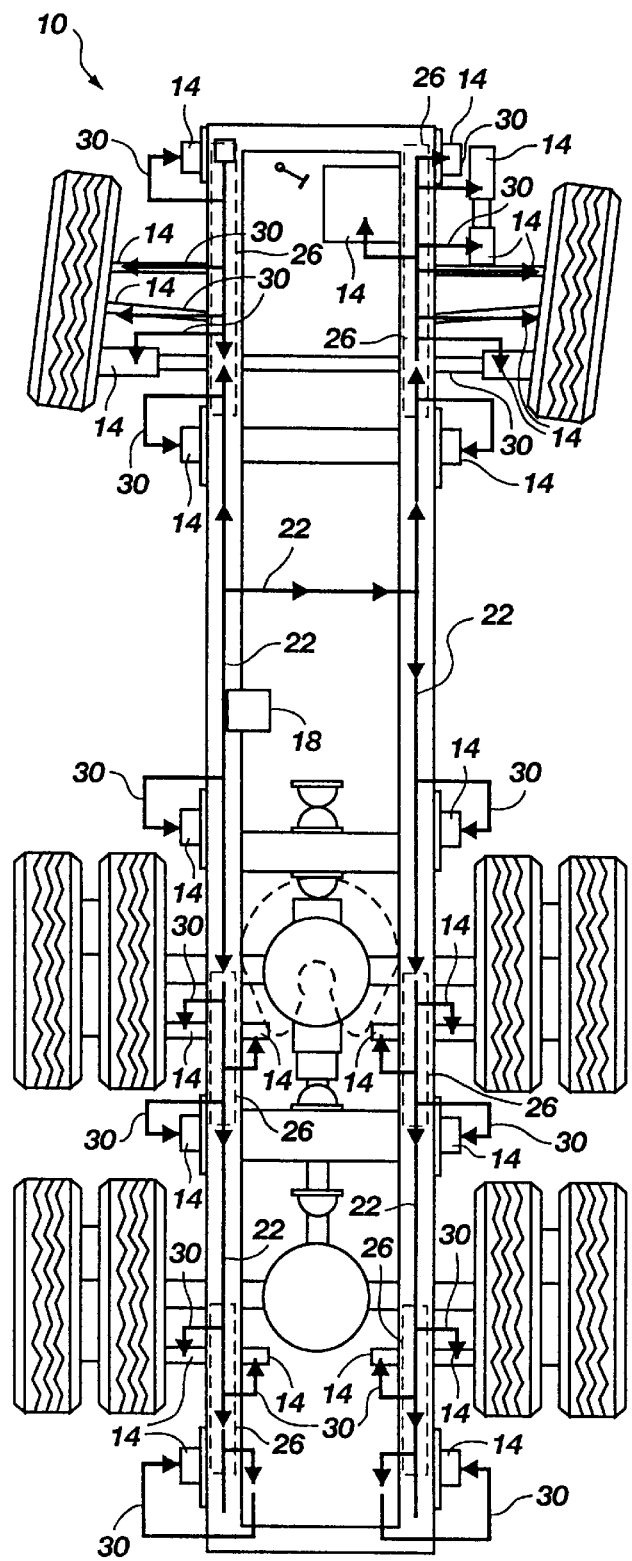
FIG. 1 shows a plan view of an autolubrication system disposed on the tractor of a tractor trailer truck in accordance with the teachings of the prior art.
Figure 2:
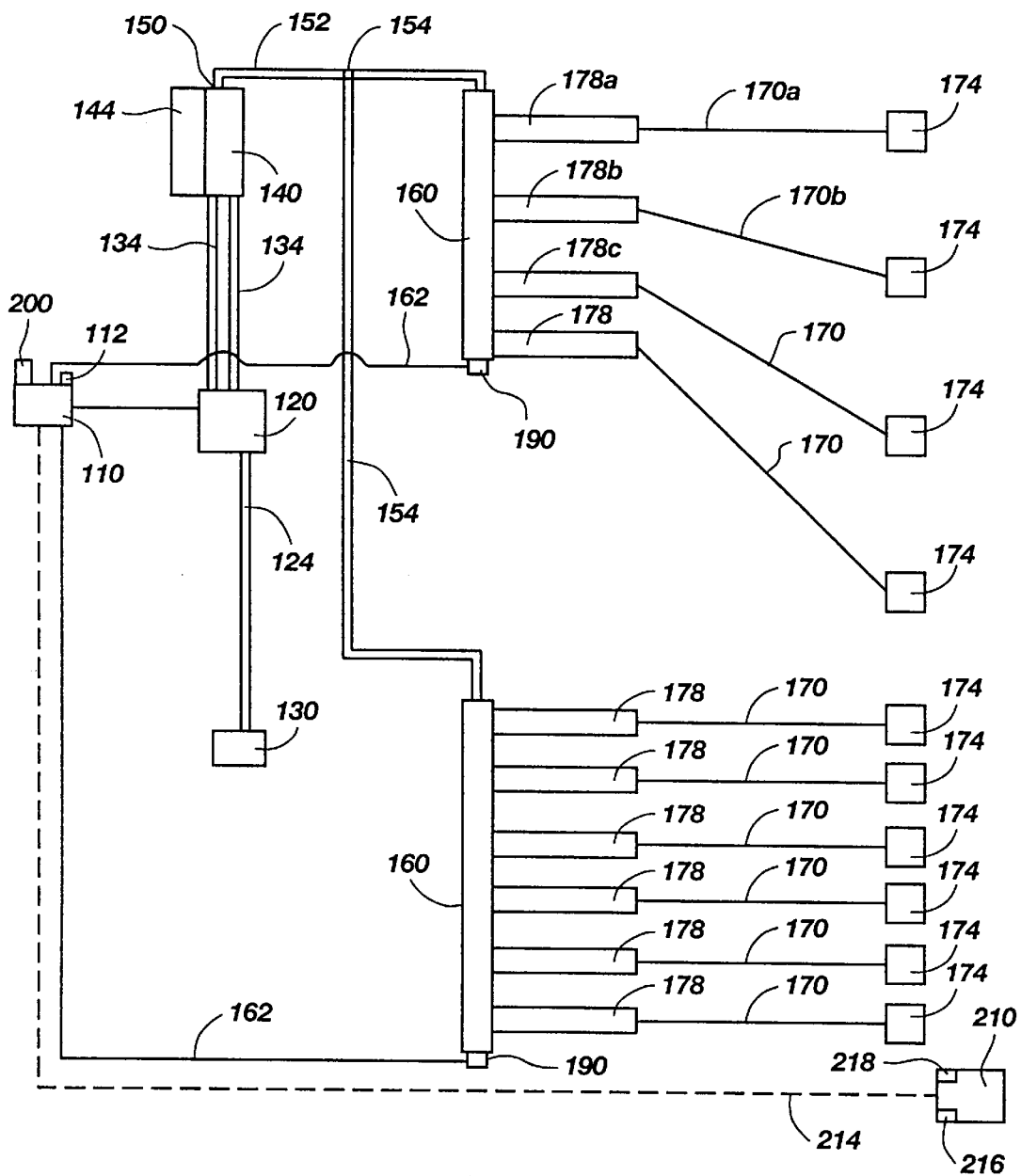
FIG. 2 shows a diagrammatic representation of an apparatus and method for checking the integrity of an autolubrication system in accordance with the teachings of the present invention.

Referring to FIG. 2, there is shown diagrammatic representation of a conventional autolubrication system with adjustments made in accordance with the principles of the present invention. A conventional autolubrication system includes a pump control 110 which is typically disposed adjacent to the driver's seat in the vehicle's driver compartment. Actuation of the pump control 110 actuates a switching mechanism, typically a solenoid valve 120. In many embodiments, the pump control 110 enables manual activation of the switching mechanism, as well as period applications under control of a timing element 112 to enable automatic dispensing of the lubricant.

The solenoid valve 120 is connected by a feed line 124 to the vehicle's air supply 130 (i.e. that used to power air brakes). The solenoid valve 120 channels the air through a pair of control lines 134 to actuate an air-operated pump 140. While numerous different pumps may be used, the air-operated pumps sold by Filtakleen Limited of Dorset, England and Filtakleen International, West Valley City, Utah work particularly well.

The pump 140 draws grease or some other lubricant from a reservoir 144 and forces the grease through one or more outlets 150 at a 12:1 elevated pressure (typically between about 1500 and 1800 psi). The outlet 150 opens to one or more conduit systems 152 used to transport the lubricant to the lubrication points (discussed below).

The conduit systems typically include two or three main conduits 154, a plurality of manifolds 160 with runner lines 170 extending therefrom. Each of the main conduits 154 is typically made of steal.

Each of the main conduits 154 leads to one or more manifolds 160. The manifolds 160 supply a plurality of runner lines 170, which carry the grease, etc., to the lubrication-receiving points 174. The runner lines 170 are typically made of plastic and are somewhat flexible.

As will be apparent to those skilled in the art, each of the lubrication receiving points 174 will not require the same amount of lubricant. For example, the hitch plate for a fifth wheel is under constant friction when a trailer is attached and therefore requires much more lubrication than some other portions of the truck. Thus, a plurality of lubricant/grease meters 178 are screwed into the manifold 160 and are positioned between the manifold and the runner lines 170 to control the volume of grease supplied to the runner lines. Thus, grease meter 178a may be configured to provide twice as much grease to runner line 170a as grease meter 178b supplies to runner line 170b, but only two-thirds as much as is supplied to runner line 170c by grease meter 178c.

In accordance with one aspect of the present invention, a pressure sensor 190 is disposed on each manifold 160. If the pump 140 is actuated, the pressure sensor should detect an initial pressure increase close to the 1200–1800 psi applied by the pump. In a properly operating system, the pressure will quickly dissipate as the lubricant passes through the meters 178 and the runner lines 170.

If the pressure sensed is below some predetermined threshold, the reading obtained by the pressure sensor 190 generates a signal indicating that there has been a failure upstream from the manifold 160, and conveys the signal via a communication line 162 to the pump control 110. The failure could occur due to a damaged main conduit 154, a damaged connection between the main conduit 154 and the manifold 160, a damaged connection between the main conduit and the pump 140, or a failure of the pump itself. Regardless of the cause, the pressure sensor 190 conveys a signal to the controller 110 which uses some alarm mechanism 200, such as a light or audible alarm, to send generate a human perceptible signal indicating the failure.

Those familiar with autolubrication systems will appreciate that such testing of the main conduits 154 and adjacent parts can be done while the vehicle is stationary or while its mobile. However, such tests only indicate whether the system is operating properly upstream from the manifolds 160. Thus, additional testing must be conducted to ensure proper functioning of the system downstream from the manifolds 160.

When lubricant is moved through the runner lines 170 under pressure, there will generally be a discharge pulse or momentary back-pressure created within the runner line. By monitoring these pulses, the user may quickly determine if lubricant is properly flowing through the meters 178 and the runner lines 170. If the runner line 170 is not properly nested in its fitting, the discharge pulse will be difficult to detect, as there is nothing to inhibit outflow of the grease.

Also shown in FIG. 2 is a remote actuation switch 210. The remote actuation switch 210 is used to actuate the controller 110 from a remote location, typically adjacent one or more of the lubrication-receiving points 174. The remote actuation switch 210 may be connected to the controller 110 by a lead wire (represented by dashed line 214) or may include a radio transmitter 218 which enables wireless communication with the controller.

Figure 3:
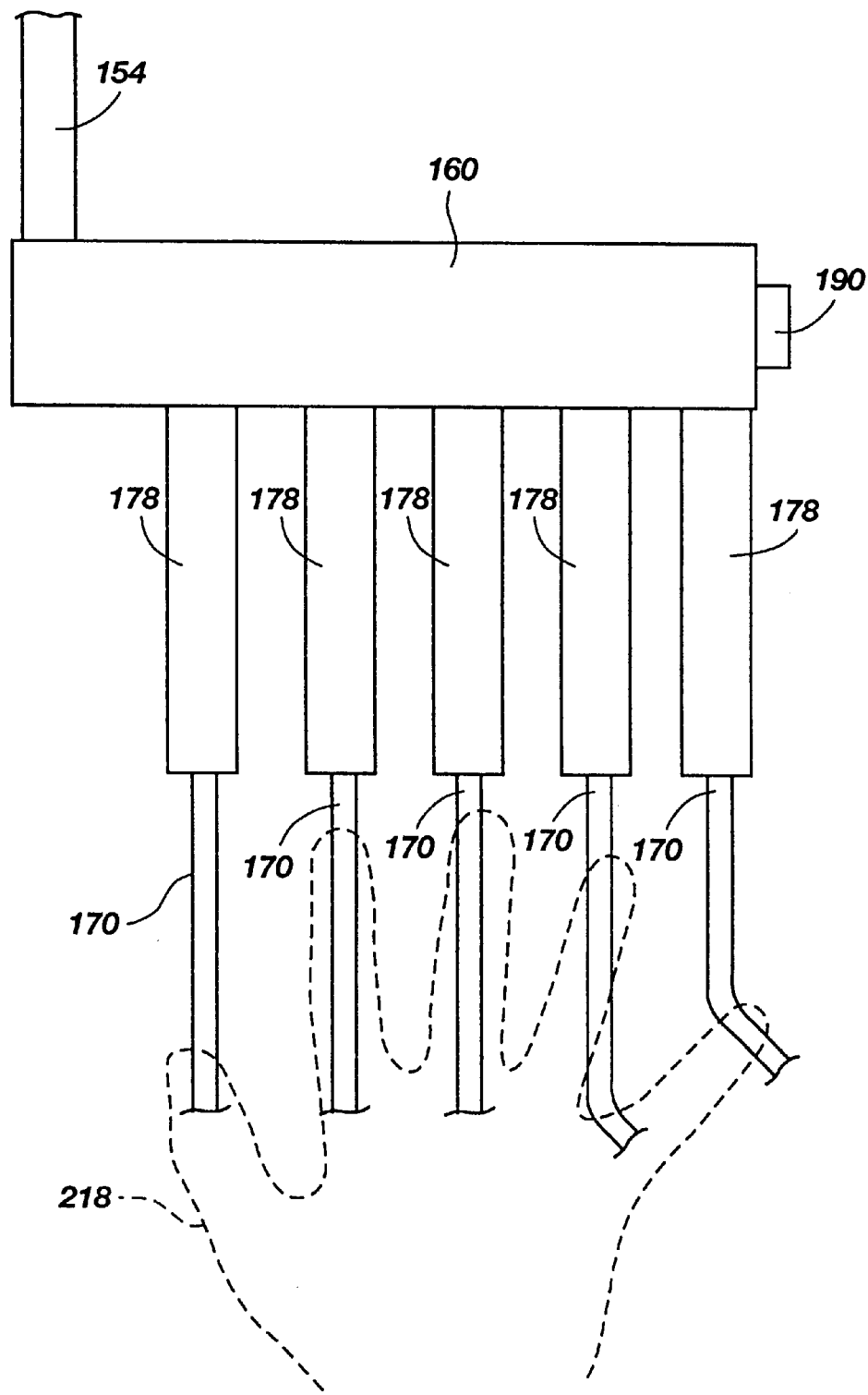
FIG. 3 shows a plurality of runner lines extending from a manifold, and one method for determining the integrity of a plurality of runner lines in accordance with the principles of the present invention.

Referring also to FIG. 3, the remote actuation switch 210 is used to activate the pump 140 while the user is standing next to some of the lubrication-receiving points 174 so that the user can determine whether the runner lines 170 are properly supplying the lubricant. By placing his or her fingers (represented by dashed FIG. 218) on the runner lines 170, the user can detect the proper flow of lubricant through each runner line by feeling for the discharge pulse generated by the pressurized lubricant. If a particular runner line 170 does not have a detectable discharge pulse shortly after the remote actuation switch 210 has been used, a fault along that runner line is indicated.

In light of the present disclosure, those familiar with such systems will appreciate that the lack of a noticeable discharge pulse may mean that no grease is getting into the runner line 170 (i.e. the grease meter is obstructed) or that there is no resistance at the end of the runner line (i.e. the runner line has pulled out of its fitting). Thus, the user will check the grease meter 178 for obstructions, and will check to ensure that the runner line 170 is properly connected to its fitting.

Because each manifold 160 usually has between four and seven runner lines 170, all of the runner lines extending from a single manifold can be checked with one or two actuations of the pump control 110. Thus, such a method of checking the integrity of the automatic lubrication system enables a common 32 point system (i.e. one using five to seven manifolds and a total of 32 runner lines) to be checked in less than 5 minutes. Those familiar with automatic lubrication systems will appreciate that this is a significant improvement over the prior art method of inspection.

Without a remote actuation switch 210 (FIG. 2), however, such a method for checking the integrity of the automatic lubrication system would not be possible. Because conventional systems are actuated only from a position adjacent the driver's seat in the vehicle's driver compartment, it is much more difficult to determine whether failures are occurring at various locations. Typically the user usually must crawl under the truck or bus and observe the lubrication-receiving points. In contrast, the present invention allows each of the runner lines 170 to be monitored by feel. Additionally, because the user need not be immediately adjacent the lubrication-receiving points 174 which may be several feet from the manifold 160, he or she is less likely to get grease stains on clothing, skin, etc.

To facilitate use of the remote actuation switch 210 may include a light or some other signaling device 216. The signaling device 216 could be used to indicate when the remote actuation switch 210 is actuating the pump control 110, thereby informing the user when to feel the runner lines. In the alternative, the signaling device could be responsive to signals from the pump controller 110 which indicate whether the pressure sensors 190 on the manifolds 160 have indicated a leak. With such an application, the user is notified of the failure sensed at the manifold while he or she is adjacent to the lubrication-receiving points and typically in a position in which the failure can be investigated.

Figure 4:
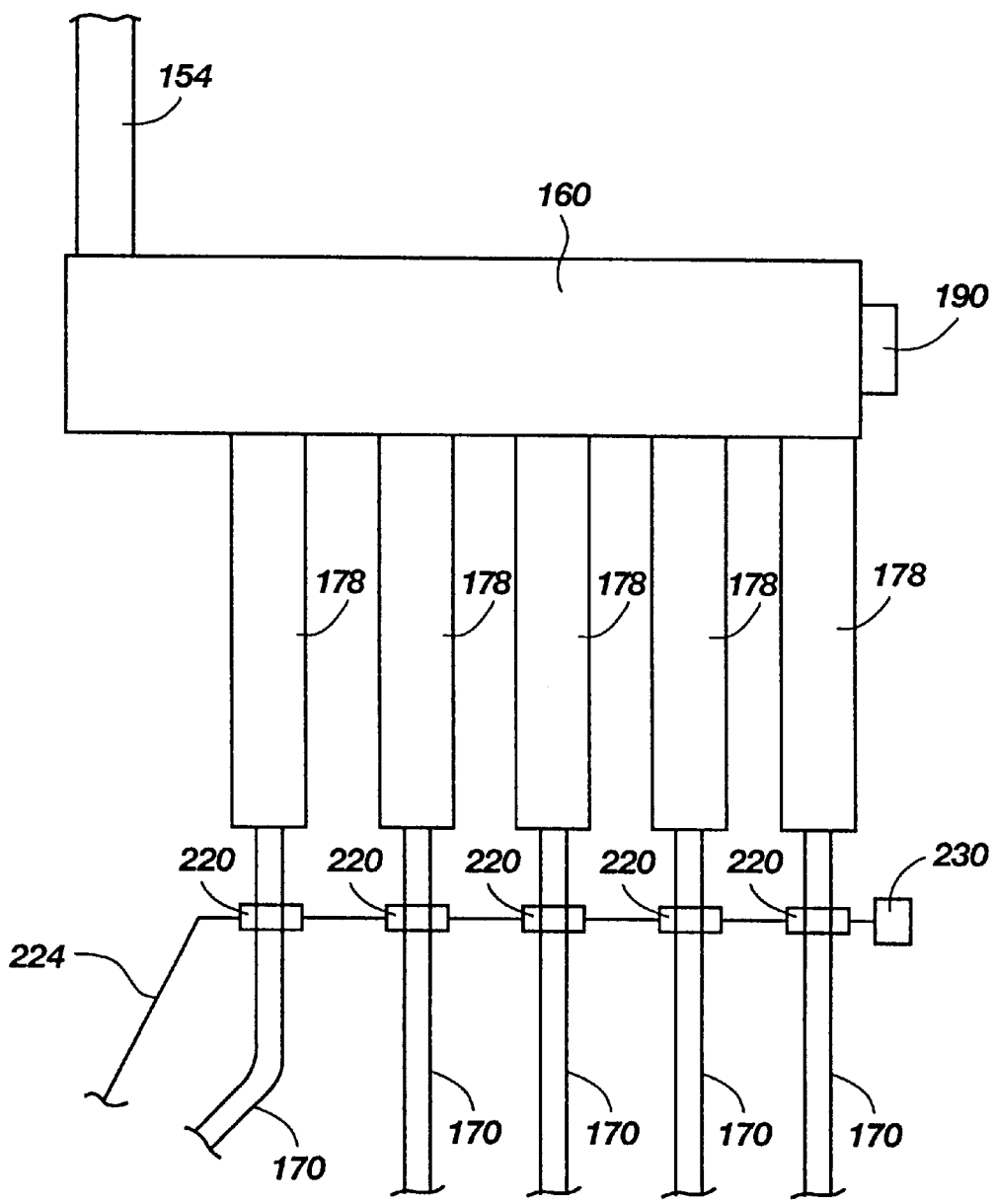
FIG. 4 shows a plurality of runner lines extending from a manifold, and an alternate method for determining the integrity of the plurality of runner lines in accordance with the principles of the present invention.

In the alternative to manually determining the presence of a discharge pulse, an automated method is shown in FIG. 4. Instead of requiring the user is place his or her hands on the runner lines 170, the embodiment shown in FIG. 4 shows a pressure sensing means in the form of a plurality of pressure transducers 220. The pressure transducers 220 are disposed so as to detect whether a discharge pulse of sufficient magnitude has passed through the runner line 170. The data obtained by the pressure transducers 220 thus indicates whether there has been a failure in the system.

In a simplistic system, each of the pressure transducers 170 disposed along runner lines 170 connected to a manifold may be connected to a device 230 for producing a human perceptible signal when a discharge pulse is not measured in one or more of the runner lines. Typically, the device would be a light. By simply looking at each light, the user could be assured that none of the runner lines 170 have experienced a failure.

Even if pressure sensors 220 are provided on the runner lines 170, it is preferable to have the remote actuation switch 210. If a light is used for a group of runner lines 170 and indicates a failure, the remote actuation switch 210 can be used to enable the user could repeat the test and use his or her fingers to determine exactly which runner line has the failure. Additionally, the remote actuation switch 210 could also be used to conduct "feel" test of the runner lines 170 periodically simply to ensure that the pressure transducers 220 are operating properly.

Of course, the method and apparatus could be more sophisticated. For example, the pressure transducers 220 could be disposed in communication with the pump control 110 via a communication cable 224. In a moderately sophisticated system, the controller would be able to determine that at least one runner line 170 associated with a particular manifold 160 experienced failure. Adapting the system in such a manner would be relatively simple, as the controller is already in communication with the pressure sensors 190 on each of the manifolds. If desired, the controller could test each manifold and its associated runner lines and then test the next manifold, etc.

In a more highly sophisticated system, the communications between the pressure transducers 220 and the pump controller 110 could be of such a configuration that the controller could determine the exact runner line 170 having the failure. The user could then correct the problem without any unnecessary delay.

One significant advantage of using the pressure transducers is that the entire system can be tested while the truck or bus is in transit, thereby obviating the need for the user to get out of the vehicle unless a failure was detected.

What level of sophistication is used in the method and apparatus for testing the autolubrication system will depend primarily on the desire of the users. Most users will be more than satisfied with a system which enables testing of the runner lines utilizing the remote actuation switch 210. However, those who often drive in extreme cold or heat will appreciate the ability to remain in the vehicle during testing.

Additionally, the timing mechanism 112 (FIG. 2) is disposed in communication with the pump control 110. The timing mechanism 112 can be programmed to cause the pump control 110 to periodically actuate the autolubrication system and to test each aspect of the system. In such a manner, the user need only concern himself or herself with the system when the pump control 110 indicates that a failure has been detected.

Thus there is disclosed an improved method and apparatus for checking the integrity of an autolubrication system. Those skilled in the art will appreciate numerous modifications which can be made without departing from the scope and spirit of the present invention. The appended claims are intended to cover such modifications.

What is claimed is:

1. An autolubrication system for attachment to a road vehicle for supplying lubricant to a plurality of lubrication-receiving points along the road vehicle, the system comprising:

pump means including a pump for supplying a lubricant at an elevated pressure;

pump control means for selectively actuating the pump means;

conduit means disposed in communication with the pump means for carrying the lubricant from the pump means to the lubrication-receiving points; and a remote activation means for operating said pump control means from a position substantially remote from the pump and outside of the vehicle;

wherein the autolubrication system further comprises pressure sensing means for monitoring pressure increases in the autolubrication system and for generating signals indicative of pressure changes within the system.

2. The autolubrication system of claim 1, wherein the remote activation means comprises a remote actuation switch connected to the pump control means by an elongate lead of sufficient length to enable a user of the remote actuation switch to actuate the pump control means from a position adjacent the lubrication-receiving points.

3. The autolubrication system of claim 1, wherein the remote activation means comprises a remote actuation switch having a wireless transmitter means for communicating with the pump control means, and wherein the pump control means includes a wireless receiver means.

4. The autolubrication system of claim 3, wherein the remote actuation switch comprises means for indicating when the remote actuation switch means is sending wireless communications to the pump control means.

5. The autolubrication system of claim 1, wherein the system further comprises means for generating a human perceptible signal responsive to the pressure sensing means when the pressure sensing means detects a pressure increase below a predetermined threshold following actuation of the pump means.

6. The autolubrication system of claim 5, wherein the means for generating a human perceptible signal comprises an audible alarm.

7. The autolubrication system of claim 5, wherein the means for generating a human perceptible signal comprises a light.

8. The autolubrication system of claim 7, wherein the light is disposed adjacent to the pressure sensing means to which the light is responsive.

9. The autolubrication system of claim 7, wherein the light is disposed in the vehicle driver compartment.

10. The autolubrication system of claim 9, wherein the means for generating a human perceptible signal is configured to indicate the location of the pressure sensing means detecting a pressure increase below the predetermined threshold.

11. The autolubrication system of claim 1, wherein the autolubrication system includes at least one main conduit, at least one manifold disposed to receive the lubricant from the at least one main conduit, and a plurality of runner lines extending from the manifold.

12. The autolubrication system of claim 11, wherein the pressure sensing means is disposed to monitor lubricant pressure changes in the at least one main conduit and the at least one manifold.

13. The autolubrication system of claim 11, wherein the pressure sensing means is disposed to monitor lubricant pressure changes in at least one of the runner lines.

14. The autolubrication system of claim 11, wherein the audible alarm is disposed in the vehicle driver compartment.

15. The autolubrication system of claim 1, further comprising timer means for automatically actuating the pump control means at a predetermined time interval.

16. The autolubrication system of claim 15, wherein the pump control means and the timer means are disposed in the vehicle driver compartment.

17. An autolubrication system for attachment to a road vehicle for supplying lubricant to a plurality of lubrication-receiving points, the system comprising:

pump means, including a pump for supplying a lubricant at an elevated pressure;

pump control means for selectively actuating the pump;

conduit means disposed in communication with the pump means for carrying lubricant from the pump means to the lubrication-receiving points;

pressure sensing means disposed along the conduit means for monitoring pressure changes within the conduit means following actuation of the pump and for generating signals when the pressure changes are below a predetermined threshold; and alarm means disposed in communication with the pressure sensing means for generating a human perceptible signal responsive to the signals generated by the pressure sensing means.

18. The autolubrication system of claim 17, wherein the conduit means comprises at least one main conduit, at least one manifold disposed to receive the lubricant from the at least one main conduit, and a plurality of runner lines extending from the manifold.

19. The autolubrication system of claim 18, wherein the pressure sensing means comprises a pressure sensor disposed on the manifold.

20. The autolubrication system of claim 18, wherein the pressure sensing means comprises at least one pressure sensor disposed in communication with at least one of the runner lines.

21. A method for checking the integrity of a road vehicle's autolubrication system, the method comprising:

a) selecting an autolubrication system having a pump for pumping lubricant under pressure and a plurality of conduits for carrying lubricant from the pump to a plurality of lubrication-receiving points on the road vehicle;

b) actuating the pump to move the lubricant through the plurality of conduits and to the lubrication-receiving points; and c) monitoring the conduits to determine pressure changes following actuating of the pump, wherein said monitoring step selected either one from the group consisting of manually monitoring the conduits with hand and mechanically monitoring the conduits with pressure sensors.

22. The method for checking the integrity of an autolubrication system of claim 21, wherein step a) comprises, more specifically, actuating the pump from a position remote from the pump and adjacent at least one of the lubrication-receiving points.

23. The method for checking the integrity of an autolubrication system of claim 21, wherein step b) comprises, more specifically, disposing a pressure sensor along a conduit and generating a human perceptible signal when detected pressure change in the conduit below a predetermined threshold.

24. The method for checking the integrity of an autolubrication system of claim 21, wherein at least some portion of the conduits are formed of a flexible material, and wherein step b) comprises, more specifically, feeling the flexible portion of the conduit with a human hand immediately after actuation of the pump to detect whether a discharge pulse is present.

* * * * *